UNITED STATES PATENT OFFICE.

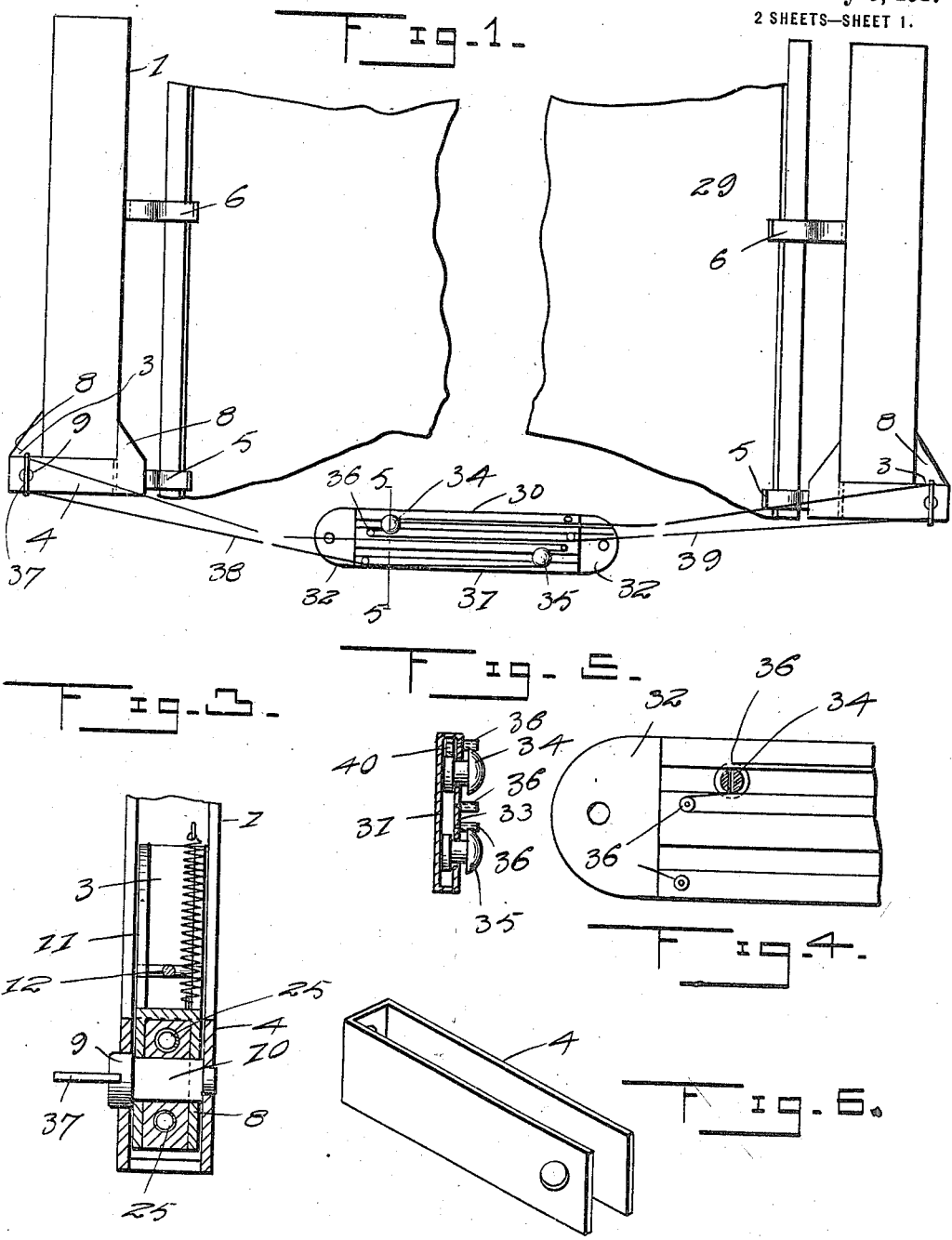

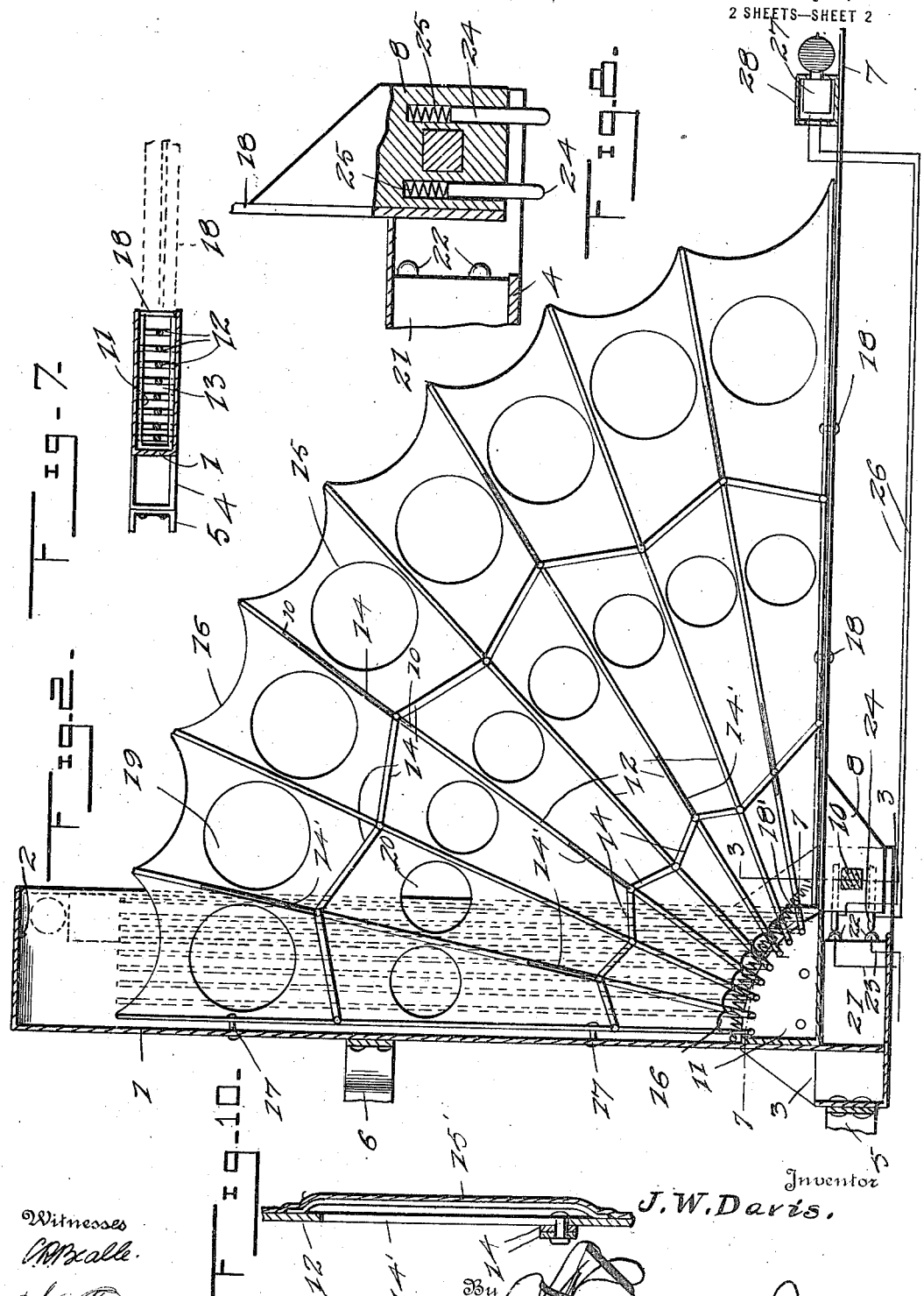

JOSEPH W. DAVIS, OF SAN FRANCISCO, CALIFORNIA.

DIRECTION-INDICATOR FOR AUTOMOBILES.

1,224,905.  Specification of Letters Patent.  Patented May 8, 1917.

Application filed May 26, 1916. Serial No. 100,088.

*To all whom it may concern:*

Be it known that I, JOSEPH W. DAVIS, a subject of the King of Great Britain, residing at San Francisco, in the county of San Francisco and State of California, have invented certain new and useful Improvements in Direction-Indicators for Automobiles; and I do hereby declare the following to be a full, clear, and exact description of the invention, such as will enable others skilled in the art to which it appertains to make and use the same.

This invention relates to a direction indicator for automobiles and has for its primary object the provision of means whereby the operator of an automobile may readily notify the traffic in rear and in front of the automobile, the direction in which he intends to turn and if he desires to make a stop.

Another object of this invention is to provide a casing secured to each side of the automobile, having signal means mounted therein, which are adapted to be swung outwardly and downwardly at the will of the operator, whereby the traffic may be notified in advance which direction the automobile is going to be turned or stopped.

Another object of this invention is to provide a plurality of rods pivotally mounted within each of the casings, having fabric connected thereto, whereby upon opening of the outer side walls of the casings, the rods will spread apart and form a substantially fan-shaped signal.

A further object of this invention is to provide electrical contact members carried by the lower ends of the casings and by the lower ends of the movable outer side walls, adapted to close electric circuits to electric lamps carried by the outer upper ends of the movable outer side walls when they are swung downwardly to illuminate the lamps to make the signals visible at night.

A further object of this invention is to provide manual operating means mounted upon the automobile in convenient reach of the operator, whereby each of the signals may be moved into a signaling or non-signaling position.

A still further object of this invention is the provision of a direction indicator for automobiles of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a rear elevation of a direction indicator for automobiles constructed in accordance with my invention, Fig. 2 is a vertical sectional view of one of the casings, illustrating the signal moved to a signaling position, Fig. 3 is a fragmentary vertical sectional view taken on the line 3—3 of Fig. 2, looking in the direction indicated by the arrows, Fig. 4 is a fragmentary plan view of the operating means, Fig. 5 is a transverse sectional view, taken on the line 5—5 of Fig. 1, Fig. 6 is a perspective view of a housing, Fig. 7 is a horizontal sectional view taken on the line 7—7 of Fig. 2, Fig. 8 is a detail sectional view of the contact members, when the signal is in a non-signaling position.

Fig. 9 is a detail view illustrating a spring catch for holding the signals in operative or signaling position, and Fig. 10 is a detail sectional view of one of the rods, illustrating a protecting strip.

Referring in detail to the drawings, the numeral 1 indicates the inner side wall of a casing 2, having an enlarged portion 3 formed on its lower end which is bolted or otherwise secured within one end of a housing 4. The housing 4 is provided with one of its ends opened and has secured to its opposite end a clamp 5 which coöperates with a clamp 6 carried by the side wall 1 for securing the casing 2 and housing 4 to an automobile. The casing 2 is provided with an outer movable side wall 7, having an enlarged portion formed on its lower end, which is positioned within the housing 4 and is provided with a squared opening to receive bolts 9, having a squared shank 10 that is carried by the side walls of the housing 4, for hingedly securing the side wall 7 within the housing.

A bracket 11, having the upper edges of its side walls of substantially arcuate shape provided with oppositely disposed and relatively spaced openings. A plurality of rods 12, having substantially T-shaped lower ends 13 are journaled in the openings of the bracket 11 and are pivotally connected together adjacent their upper and lower ends by links 14. Every other one of the rods 12 is slotted as illustrated at 14' to allow the links 14 to slide upwardly and downwardly upon said rods and have protector strips 15' secured thereto to prevent the links from being caught or held during sliding operation. A suitable piece of continuous fabric 15 is secured to each of the rods 12 and is provided at its upper and lower ends with arcuate-shaped cut away portions 16 to form a substantially fan-shaped signal. The innermost rod 12 is secured to the inner wall 1 by means of bolts 17 and the outermost rod 12 is rigidly secured to the movable wall 7 by bolts 18, whereby upon swinging the movable wall 7 downwardly, the fan-shaped signal will be unfolded or opened. A suitable coil spring 18' is secured at one end to the inner wall 1 of the casing 2 and has its opposite end secured to the movable wall 7, for aiding in moving the movable wall 7 to a vertical position or into an engagement with the casing 2, thus collapsing or folding the fan-shaped signal within the casing as clearly illustrated in Fig. 2 in dotted lines. The fabric 15 is provided with circular openings 19 and 20 between each of the rods 12 for reducing the resistance of wind against the fabric when the signal is in a signaling position as illustrated in full lines in Fig. 2. A contact block 21 is mounted within the housing 4 adjacent the lower end of the inner wall 1 of the casing 2 and is provided with contact points 22, which have conductors 23 connected therewith and which are in turn connected with the lighting system of an automobile. The enlarged portion 8 of the movable wall 7 is provided with a pair of recesses which slidably receive contact pins 24 which are urged outwardly by means of coil springs 25 located between the bottom walls of the recesses and the inner ends of the contact pins 24. Conductors 26 are connected to the contact pins 24 and to an electric lamp 27 carried by a suitable socket or bracket 28, which is secured to the outer and upper end of the movable wall 7. When the movable wall 7 is swung downwardly to a horizontal position, the contact pins 24 come into engagement with the contacts 22 carried by the contact block 21 and close the circuit to the electric lamp 27, illuminating same so that the signal will be visible at night time.

In operation, one of the casings carrying the fan-shaped signal is secured to each side of a wind shield 29 of an automobile by the clamps 5 and 6, but if desired may be connected to other points of the automobile by changing the construction of the clamps 5 and 6. A manually operated means 30, which will be hereinafter more fully described is secured to the automobile in convenient reach of the operator and is operably connected to the movable wall of the casing for swinging said wall to a horizontal position to spread or open the fan-shaped signal to indicate to the traffic which direction the operator of the automobile is going to turn.

The manual operating means 30 consists of a plate 31, having ears 32 formed on each end whereby the same may be bolted or otherwise secured to the automobile. The plate 31 is provided with a top plate 33 which is provided with elongated slots to receive slide buttons 34 and 35 which are provided with openings 36 in the shank portions thereof. The bolts 9 which pivotally secure the movable wall 7 within the housing 4 is provided with an arm 37 having openings in each end thereof. A cord or flexible cable 38 passes through the button 35 and over one of the rollers 36 and has its free ends secured to each end of the arm 37 of the bolts 9 of one of the casings 2, whereby upon sliding the button 35 upon the plate 31, the outer movable wall of said casing will be moved to a horizontal position bringing the fan-shaped signal into view, and by sliding the button 35 in an opposite direction, the signal will be returned within the casing. A cord or flexible cable 39 passes through the button 34 and over one of the pulleys 36 and is connected to the arm upon the bolts 9 of the other casing, whereby upon sliding the button 34, the movable wall of the casing will be swung to a horizontal position causing the fan-shaped signal within the casing to unfold and by moving the button 34 in the opposite direction, the fan-shaped signal will be folded within the casing and the movable outer wall moves to a vertical position and within an engagement with the casing, thus it will be noted that the operator of the automobile may readily notify traffic in front and rear of the automobile when he desires to turn to the right or left and also may indicate to the traffic when he desires to stop by displaying both of the fan-shaped signals simultaneously.

Suitable spring clips 40 are adapted to engage the buttons 34 and 35 and hold them against movement to prevent the fan-shaped signals from returning to the casing under the influence of the springs 18', whereby the operator may use his hands for operating the automobile after the signals have been moved into signaling position.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A direction indicator for automobiles comprising a casing, a movable wall carried by said casing, means for swinging said movable wall to a horizontal position, a bracket mounted within the lower end of said casing and provided with the upper edges of the side wall of substantially arcuate shape, a plurality of rods pivotally secured to the arcuate-shaped edges of the side wall of the bracket, links pivotally connected to each of the rods, fabric secured to the rods, means for securing the innermost rod to the casing, means for securing the outermost rod to the movable wall to cause said rods to spread apart when the movable wall is swung to a horizontal; and means for securing the casing to an automobile.

2. A direction indicator comprising a casing, a movable wall carried by said casing, means for swinging said movable wall to a horizontal position, a bracket mounted within the lower end of the casing and provided with the upper edges of the side wall thereof substantially arcuate-shape and provided with a plurality of relatively spaced and oppositely disposed openings, a plurality of rods provided with T-shaped lower ends journaled within the openings, means for connecting said rods together, fabric secured to the rods, means for securing the innermost rod to the casing, means for securing the outermost rod to the movable wall, and means for securing the casing to an automobile.

3. A direction indicator comprising a casing consisting of an inner side wall, a housing secured to said casing and inner side wall, a movable wall pivotally secured to the housing, a substantially fan-shaped signal secured to the inner side wall and to the movable side wall, an electric lamp carried by the movable side wall, a contact member mounted within the housing and operatively connected to an electrical source, contact members carried by the contact block, an enlarged portion formed on the lower end of the movable wall and provided with slots therein, spring pressed contact pins slidably mounted within the slots, means for connecting the slidable contact pins with the electric lamp, and means for swinging the movable side wall into a horizontal position to display the substantially fan-shaped signal and to illuminate the electric lamp.

In testimony whereof I affix my signature.

JOSEPH W. DAVIS.

Copies of this patent may be obtained for five cents each, by addressing the "Commissioner of Patents, Washington, D. C."